Sept. 8, 1959      L. G. SIMJIAN      2,902,767
INVENTORY SYSTEM
Filed Feb. 27, 1958      2 Sheets-Sheet 1
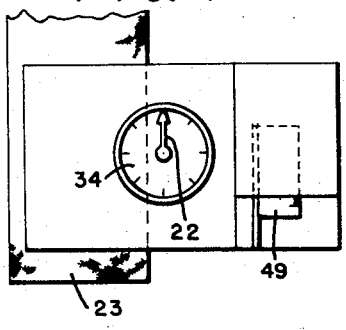
FIG. 1
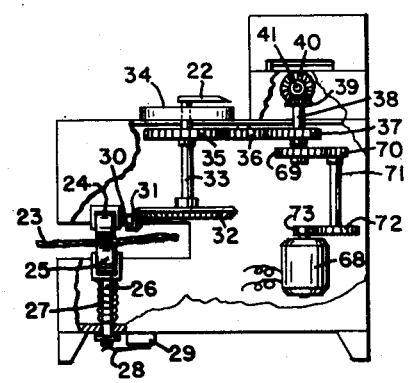
FIG. 2
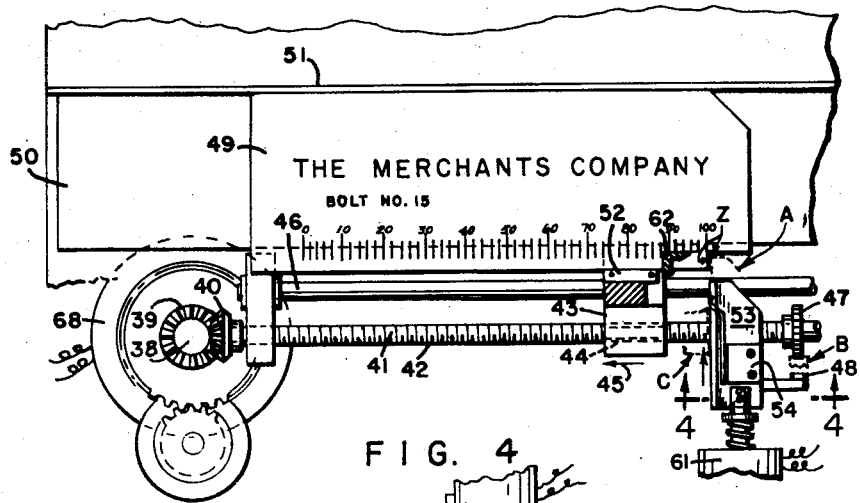
FIG. 3
FIG. 4
FIG. 5
INVENTOR.
LUTHER G. SIMJIAN
BY
AGENT.

Sept. 8, 1959     L. G. SIMJIAN     2,902,767
INVENTORY SYSTEM

Filed Feb. 27, 1958     2 Sheets-Sheet 2

INVENTOR.
LUTHER G. SIMJIAN
BY
AGENT.

United States Patent Office 2,902,767
Patented Sept. 8, 1959

2,902,767
INVENTORY SYSTEM

Luther G. Simjian, Greenwich, Conn., assignor to Reflectone Electronics, Inc., Stamford, Conn., a corporation of Connecticut Application February 27, 1958, Serial No. 718,066

14 Claims. (Cl. 33—129)

This invention generally relates to an inventory system for use in connection with dispensable material which is normally stored in bulk form. More specifically, this invention has reference to a means for recording and indicating the quantity of material dispensed and the amount of material still remaining in bulk form.

The instant invention is related also to my copending application for U.S. Letters Patent, Serial No. 522,205 filed July 15, 1955, entitled "Inventory System," now the U.S. Patent 2,832,146 issued April 29, 1958.

When dispensing material from bulk, two main problems present themselves which are firstly, measuring the quantity of material dispensed and secondly, determining the quantity of material remaining in bulk form. As a typical example, it may be well to consider the problem of stores which sell textile goods or other flexible materials which are normally wound around a wooden or cardboard core so as to produce a roll of material or a bolt. In retail stores where such material is sold in small lengths, it is very difficult to keep an accurate record of the material remaining in any one bolt and therefore when a store inventory is to be taken, or at any other time when it is desired to determine the lengths of cloth remaining on a bolt or in bulk form, all the material must be unwound and run through a measuring machine in order to determine the amounts of material remaining. Such an operation is time-consuming and in addition, the cloth must be rewound on the core and then placed back on the shelf. The present invention eliminates this work and provides a simple and easy method of determining the exact length of cloth or of other material remaining on a bolt or in bulk form.

To this end, the instant device employs a tabulating record which cooperates with a dispensing means and marking means, to provide indicia on a tabulating record, the indicia being indicative of the amount of material dispensed and, when desired, indicative also of the amount of material remaining in bulk form. The tabulating record then may be processed by hand or by automatic machines for accounting purposes or moreover, to provide a perpetual inventory of the material on hand. Interlocking features are included to permit dispensing of material only when a tabulating record is properly positioned and in coacting relationship with said dispensing means.

One of the objects of this invention is therefore the provision of an improved inventory system which avoids one or more of the disadvantages and limitations of prior art arrangements.

Another object of this invention is the provision of a tabulating record which is provided with indicia corresponding to the quantity of material dispensed.

A further object of this invention is the provision of a tabulating record which indicates the amount of material remaining in bulk form.

Another and further object of the invention is to provide indicia on a tabulating record when dispensing material and prevent dispensing of material unless a suitable tabulating record is properly positioned.

Another and further object of this invention is the provision of tabulating records when dispensing material from bulk, these tabulating records being capable of becoming processed by hand or by automatic accounting machines.

Still another and further object of this invention is to reduce the cost of inventory listing, to maintain more accurate accounting records and to provide a perpetual inventory.

The invention comprises a dispensing means which is adapted to be operated to cause dispensing of material from bulk. The dispensing means is equipped also with means for receiving a tabulating record. Interlock means are provided to cause the dispensing means to be operative only when a tabulating record is in operative engagement with the dispensing means. Marking means coacting with the tabulating record and the dispensing means cause indicia to be placed on the tabulating record which are responsive to the quantity of material dispensed in response to the operation of the dispensing means.

For a better understanding of the present invention together with other and further objects thereof, reference is made to the following description taken in connection with the accompanying drawings in which:

Figure 1 is a plan view, in generalized form, of the dispensing means;

Figure 2 is an elevational view, partly in section, of certain mechanisms of the dispensing means;

Figure 3 is a plan view, partly in section, of certain portions of the mechanisms indicated in Figure 2;

Figure 4 is a sectional view at line 4—4 of Figure 3;

Figure 5 is an elevational view, partly sectioned, illustrating in enlarged scale certain parts indicated in Figure 4;

Figure 6:
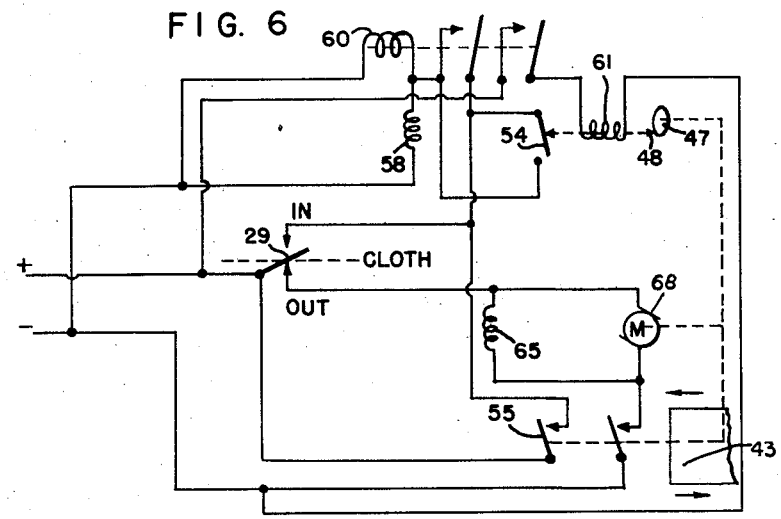
Figure 6 is a schematic electrical circuit diagram showing the circuit connections applying to the electrical components of the dispensing means illustrated in Figures 1 through 5.

Referring now to the figures and Figures 1 through 5 in particular, numerals 24 and 25 (Figure 2) identify a pair of coacting rollers of the dispensing device, the rollers being positioned one above the other for receiving therebetween material to be dispensed, such as cloth 23 which is to be dispensed from a bolt and which is measured as it passes through the rollers. Roller 24 is mounted stationary in axial direction whereas roller 25 is attached to a rod 26 surrounded by a spring 27 so as to resiliently support roller 25 upwardly against roller 24. The free end of rod 26 is in contact with a lever arm 28 of switch 29, the switch thereby becoming actuated to sense the presence of material between rollers 24 and 25.

A shaft 30 attached to roller 24 carries a miter gear 31 meshing with miter gear 32 to drive pointer 22 via shaft 33. Pointer 22 thereby indicates with respect to dial face 34 the quantity of cloth which has passed between rollers 24 and 25.

Shaft 33 carries also a spur gear 35 which meshes with spur gear 36 and which drives through the combination of gear 37, shaft 38, miter gears 39 and 40, a shaft 41. Shaft 41 is equipped with a threaded portion 42 (Figures 3 and 4) which engages a threaded aperture 44 within carriage 43 to drive the carriage axially along shaft 41. Carriage 43 is further supported by rod 46 which is disposed parallel to shaft 41 and upon which the carriage slides. A stop 53 serves to limit the travel of the carriage 43 toward the right. This stop is shown retractably positioned, the other position being indicated by dashed line A (Figure 3). The stop supports also two limit switches 54 and 55 (Figures 4 and 5) which have actuating arms 56 and 57 respectively. Actuating arm 57 (Figure 5) senses when carriage 43 has returned to "home position" identified by letter C (Figure 3). Actuating arm 56 senses that a tabulating record 49 has been inserted on a table 50 between guides 51 and 52. The tabulating record may be a conventional paper type tabulating card or it may comprise a record of plastic material or of other suitable manufacture which can be provided with indicia.

Stop 53 supports also a pawl 48 which engages star wheel 47 which is fastened to shaft 41 to normally prevent rotation of the shaft as indicated by dashed line B (Figure 3). A solenoid 61 is connected to stop 53 and serves to retract stop 53 and pawl 48 when dispensing of material is made possible.

Upper portion 63 of carriage 43 (Figure 4) guides a punch 62 which coacts with a die 64 on carriage 43 located directly underneath punch 62 to cut a right angle notch in the tabulating record 49 when the record is placed therebetween as will be more fully described hereafter. The punch 62 is attached to, and operated by, a solenoid 65 supported by a bracket 66. A clamp 59 supported directly above the tabulating card 49 by a bracket 67 is operated by a pair of solenoids 58 so as to clamp and hold the tabulating record 49 in position. Shaft 38 is driven by an electric motor 68 through gears 69, 70, shaft 71 and gears 72 and 73.

The operation of the entire mechanism will be understood more clearly from the following description when taken in conjunction with the schematic circuit diagram, Figure 6.

The end of a material to be dispensed, such as the end of a bolt of cloth, is inserted between rollers 24 and 25 for measuring off a certain quantity. In placing the cloth between the rollers, switch 29 is actuated thereby signifying that material to be dispensed is in engagement with the dispensing means. Next, a tabulating record 49 is placed on table 50 and moved inwardly between guides 51 and 52 until the right edge of the tabulating record rests against stop 53, thus closing circuit switch 54 by means of actuation of arm 56.

The closing of switches 29 and 54 completes a circuit through clamping solenoids 58 thereby clamping tabulating record 49 in position beneath clamp 59. Relay 60 also becomes energized causing energizing of a second circuit which comprises solenoid 61 which retracts stop 53 from the dashed position indicated by letter "A" to that shown in Figure 3. Since pawl 48 is secured to stop 53, it is withdrawn at the same time from engagement with star wheel 47, thus leaving shaft 41 free to rotate.

A second pair of contacts associated with relay 60 closes a bypass circuit so as to bypass switch 54 and to hold the former circuit closed when switch 54 is open due to stop 53 being retracted and moving arm 56 associated with switch 54 out of engagement with the edge of the tabulating record 49.

The cloth 23 can now be drawn manually between rollers 24 and 25 for measurement of the desired amount of material, the quantity becoming apparent on the combination of pointer 22 and dial 34 through cooperating gears 31, 32 and shaft 33. At the same time, shaft 41 is rotated due to coupling therewith by means of gears 35, 36, 37, shaft 38, miter gears 39 and 40 (Figure 2). The rotation of shaft 41 advances the carriage in the direction of the arrow 45 due to the engagement of threads 42 and 44.

As the carriage moves toward the left, away from the stop 53, the limit switch 55 becomes closed. When the required amount of cloth has been measured it is cut and removed from between rollers 24 and 25, which action operates switch 29 to cause closing of the circuit to the punch solenoid 65 and causing punch 62 to be moved downwardly to notch tabulating record 49 and stop at a position E (Figure 4) where the punch remains held by virtue of solenoid 65 still remaining energized. The motor circuit also becomes energized, causing power to flow to motor 68 which through gears 72, 73, shaft 71, gears 70 and 69, shaft 38, and gears 39 and 40 rotates shaft 41 in reverse direction so as to return carriage 43 in the direction of arrow 80 (Figure 4) to rest at position C (Figure 3) against stop 53. As carriage 43 travels toward the right, the knife edge 62a of punch 62 cuts tabulating card 49, leaving an elongated notch Z (Figure 3) in tabulating record 49 so that when the record is reinserted recordation will start where the previous cutting stopped, thus indicating a balance amount of cloth on the bolt to which the record refers.

It will be seen that the tabulating record may be preprinted with quantity information so that the tabulating record may be read directly as to the quantity dispensed or also as to the quantity remaining in bulk form. The tabulating record, when using a new tabulating record for each dispensing operation, may be sent to a central office for tabulating the amount of sale and the amount of material still remaining in bulk form, or when associating a distinct tabulating record with each material, for instance each bolt, this tabulating record will indicate at all times the amount of material remaining in bulk form. In this manner the cards of the inventory will be available at once and stocking and accounting functions are greatly facilitated. It will be apparent that the cards may be "keyed" to the respective bolt so as to assure use of the correct associated card and that such devices as cooperating keying means between the dispensing means and the tabulating record may be provided to serve for this purpose.

Figure 7:
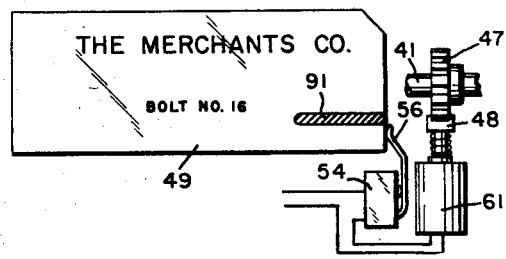
Figure 7 is a plan view illustrating an alternate design for marking a tabulating record.
Figure 8:
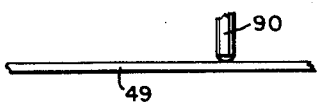
Figure 8 is an elevational view, partly schematic, illustrating the marking of the tabulating record.

Figures 7 and 8 show an alternate method of marking. Stripe 91 produced by stylus 90 may represent a colored line of ink, magnetic ink, conductive ink or other suitable graphic means. The length of the line is responsive to the amount of material dispensed. Switch arm 56 senses that a tabulating record is present. When using the record for continuous inventory purposes, the length of the line as well as the end of the stripe for establishing the starting point of the next succeeding dispensing operation may be read by photoelectric, magnetic or electrically conductive sensing means respectively, as is well known in the art. In this manner, the tabulating record may be positioned accurately and in a manner similar to the method described in connection with Figures 1 through 6.

Figure 9:
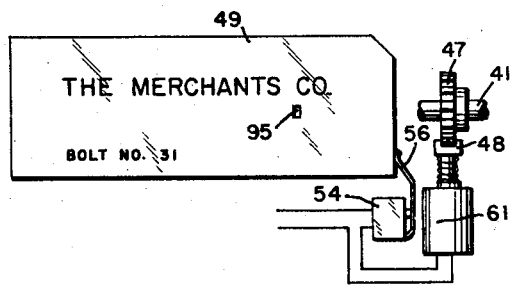
Figure 9 is a plan view indicating another method for providing a tabulating record with indicia the position of which is responsive to the quantity of material dispensed.

Figure 9 shows another variation of marking, employing conventional perforation 95 to indicate the amount of material dispensed and/or remaining in bulk form.

This perforation may be sensed by conventional electrical or mechanical sensing means as is well known in the art of tabulating machinery. Obviously, printing wheels may be used for direct reading without deviating from the principles described.

It will be observed however, that in all cases the dispensing device is inoperative until a tabulating record is properly positioned so that in all instances a permanent record of the material dispensed is provided which may be used for accounting and inventory purposes.

While there have been described certain embodiments of the instant invention, it will be apparent to those skilled in the art that various modifications and changes may be made therein without deviating from the broad principle of the invention disclosed which shall be limited only by the scope of the appended claims.

What is claimed is:

1. An inventory system for use in connection with dispensable material from bulk comprising; dispensing means adapted to be operated to cause dispensing of the material from bulk; said dispensing means adapted also to receive a record means; means causing said dispensing means to be operative only when a record means is in operative engagement therewith; marking means coacting with said record means and said dispensing means to cause on said record means indicia responsive to the quantity of material dispensed in response to the operation of said dispensing means.

2. An inventory system for use in connection with dispensable material from bulk comprising; dispensing means adapted to be operated to cause dispensing of the material from bulk; said dispensing means adapted also to receive a removable tabulating record; means causing said dispensing means to be operative only when a tabulating record is in operative engagement therewith; marking means coacting with said tabulating record and said dispensing means to provide said tabulating record with indicia whose position is responsive to the quantity of material dispensed in response to the operation of said dispensing means.

3. An inventory system for use in connection with dispensable material from bulk comprising; dispensing means adapted to be operated to cause dispensing of the material from bulk; said dispensing means adapted also to receive a tabulating record; means causing said dispensing means to be operative only when a tabulating record and said material are in operative engagement with said dispensing means; marking means coacting with said tabulating record and said dispensing means to provide said tabulating record with indicia whose position is responsive to the quantity of material dispensed in response to the actuation of said dispensing means.

4. An inventory system for use in connection with dispensable material from bulk comprising; dispensing means adapted to be operated to cause dispensing of the material from bulk; said dispensing means adapted also to receive a tabulating record; means causing said dispensing means to be operative only when a tabulating record is in operative engagement therewith; marking means coacting with said tabulating record and said dispensing means to cause on said tabulating record indicia responsive to the quantity of material dispensed and to the quantity of material remaining in bulk in response to the operation of said dispensing means.

5. An inventory system for use in connection with dispensable material from bulk comprising; dispensing means adapted to engage the material to be dispensed from bulk and causing dispensing of the material when actuated; said dispensing means adapted also to receive a card type tabulating record; means causing said dispensing means to be operative only when engaging the material and when a tabulating record is in operative engagement therewith; marking means coacting with said tabulating record and said dispensing means to cause on said tabulating record indicia responsive to the quantity of material dispensed in response to the operation of said dispensing means.

6. An inventory system for use in connection with dispensable material from bulk comprising; dispensing means adapted to be operated to cause dispensing of the material from bulk; said dispensing means adapted also to receive a tabulating record which is associated with said material; means causing said dispensing means to be operative only when said tabulating record is in operative engagement therewith; marking means coacting with said tabulating record to provide said record with indicia responsive to the quantity of material dispensed and to the quantity of material remaining in bulk, and positioning means coacting with said marking means for positioning said tabulating record prior to the next succeeding actuation of said dispensing means to a position on said record which is responsive to the quantity of material remaining in bulk from the previous actuation of said dispensing means.

7. An inventory system for use in connection with dispensable material comprising; dispensing means which include material engaging means and a numerical indicating means which shows a value responsive to the length of material passed through said engaging means; said dispensing means adapted also to receive a tabulating record; means causing said dispensing means to be operative only when a tabulating record is in operative engagement therewith and said material engaging means engage material; marking means coacting with said tabulating record and said dispensing means to cause said tabulating record to be provided with indicia responsive to the quantity of material passed therethrough in response to the operation of said dispensing means.

8. An inventory system for use in connection with dispensable material comprising; dispensing means which include material engaging means and a numerical indicating means which shows a value responsive to the length of material passed through said engaging means; said dispensing means adapted also to receive a tabulating record; means causing said numerical indicating means to be operative only when a tabulating record is in operative engagement with said dispensing means and said material engaging means engage material; marking means coacting with said tabulating record and said dispensing means to cause relative motion between said marking means and said tabulating record to provide said tabulating record with indicia responsive to the quantity of material passed through said material engaging means and indicated on said numerical indicating means.

9. An inventory system for use in connection with dispensable material from bulk comprising; dispensing means which include material engaging means and a numerical indicating means which shows upon actuation of said dispensing means a value responsive to the length of material passed through said engaging means; said dispensing means adapted also to receive a tabulating record associated with said material; means causing said numerical indicating means to be operative only when a tabulating record is in operative engagement with said dispensing means and said material engaging means engage material to be dispensed; marking means coacting with said tabulating record and said dispensing means to cause relative motion between said marking means and said tabulating record to provide said tabulating record with indicia responsive to the quantity of material passed through said material engaging means and to the quantity of material remaining in bulk, and adjustable positioning means coacting with said tabulating record for positioning said tabulating record relative to the marking means prior to the next actuation of said dispensing means to a position which is responsive to the quantity of material remaining in bulk from the previous actuation of said dispensing means.

10. An inventory system as set forth in claim 8 wherein said marking means include provisions for effecting visible graphic markings on said record.

11. An inventory system as set forth in claim 9 wherein said marking means include a cutting edge acting upon said record.

12. An inventory system for use in connection with dispensable material from bulk comprising; dispensing means adapted to be operated to cause dispensing of the material from bulk; said dispensing means adapted also to receive a record means; means causing said dispensing means to be operative only when a record means is in operative engagement therewith; marking means coacting with said record means and said dispensing means to cause on said record means indicia responsive to the quantity of material remaining in bulk in response to the operation of said dispensing means.

13. An inventory system for use in connection with dispensable material from bulk comprising; dispensing means adapted to engage the material to be dispensed from bulk and causing dispensing of the material when actuated; said dispensing means adapted also to receive a record means; means causing said dispensing means to be operative only when engaging the material and when a record means is in operative engagement therewith; marking means coacting with said record means and said dispensing means to cause on said record means indicia responsive to the quantity of material remaining in bulk in response to the operation of said dispensing means.

14. An inventory system for use in connection with dispensable material from bulk comprising; dispensing means adapted to be operated to cause dispensing of the material from bulk; said dispensing means adapted also to receive a removable tabulating record; means causing said dispensing means to be operative only when a tabulating record is in operative engagement therewith; marking means coacting with said tabulating record and said dispensing means to provide said tabulating record with indicia whose position is responsive to the quantity of material remaining in bulk in response to the operation of said dispensing means.

References Cited in the file of this patent

UNITED STATES PATENTS

| | | |
|---|---|---|
| 289,602 | Barrows | Dec. 4, 1883 |
| 871,645 | Sperling | Nov. 19, 1907 |
| 1,630,039 | Voegeli | May 24, 1927 |
| 2,128,709 | Kramer | Aug. 30, 1938 |